April 14, 1925.  1,533,279
J. D. STURGEON
ELECTRICAL CONNECTION FOR RAILWAY RAILS
Filed Oct. 31, 1922
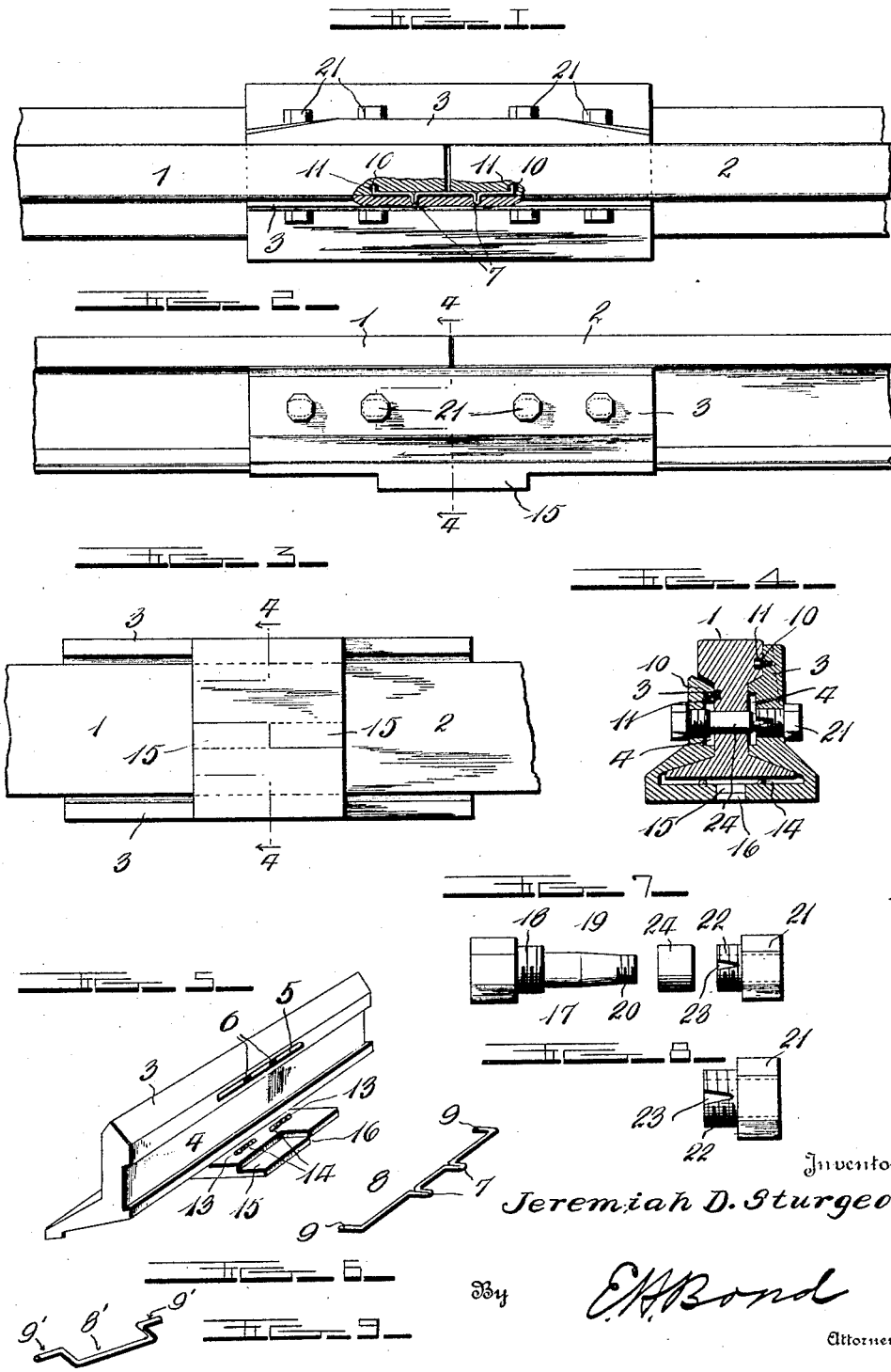
Inventor
Jeremiah D. Sturgeon
By E. H. Bond
Attorney Patented Apr. 14, 1925.

1,533,279

UNITED STATES PATENT OFFICE.

JEREMIAH D. STURGEON, OF GUTHRIE, OKLAHOMA.

ELECTRICAL CONNECTION FOR RAILWAY RAILS.

Application filed October 31, 1922. Serial No. 598,113.

*To all whom it may concern:*

Be it known that I, JEREMIAH D. STURGEON, a citizen of the United States, residing at Guthrie, in the county of Logan and State of Oklahoma, have invented certain new and useful Improvements in Electrical Connections for Railway Rails, of which the following is a specification.

This invention relates to certain new and useful improvements in electric connectors and more particularly to that class designed primarily for use as rail-bonds to electrically connect together sections of rails on electric railways.

The present invention has for its objects among others to provide a simple, yet efficient and reliable bonding which can be readily applied and which will be perfectly dependable in use.

The present invention has for a further object to provide improved fish plates for use in such bonding, and further to provide for the expansion and contraction of the rails by the employment of balls disposed in recesses in the fish plates.

Other objects and advantages of the invention will hereinafter appear, and the novel features thereof will be specifically defined by the appended claims.

The invention, in its preferred forms, is clearly illustrated in the accompanying drawings, which, with the numerals of reference marked thereon, form a part of this specification, and in which—

Figure 1 is a top plan with portions broken away.

Figure 2 is a side elevation.

Figure 3 is a bottom plan.

Figure 4 is a vertical cross section, on the line 4—4 of Figure 3, looking in the direction of the arrows.

Figure 5 is a perspective view of one of the fish plates.

Figure 6 is a perspective view of the bonding wire.

Figure 7 is a side elevation of the bolt employed to secure the fish plates and rail sections together.

Figure 8 is an enlarged elevation of the nut employed in connection with such bolt.

Figure 9 is a perspective view of a modified form of insert wire.

Like numerals of reference indicate like parts throughout the several views.

Referring to the drawings—

1 and 2 designate abutting rails.

3 are the fish plates. Each fish plate is formed upon its face adjacent the rail with a longitudinal groove 4 so as to provide a space as seen best in Figure 4 to reduce contact of the plates with the web of the rail at this point. This face of the fish plate is also provided with a recess or depression 5 as seen clearly in Figure 5 for the reception of the bonding wire, and also with deeper depressions 6 for the reception of the free loops 7 which permit of the adjustment of the bonding wire. The wire 8 has its ends turned at substantially right angles to its length, as seen at 9 to engage in the copper bushings or inserts which are secured in openings 10 in the web of the rail, the bushings or inserts 11 being retained in the said openings in any suitable manner as by being driven therein.

The fish plates have the base extensions 12 which are rabbeted or halved out upon opposite faces, the rabbet extending for substantially one half the length of the extension upon each side thereof and when the two extensions are interfitted they make a snug joint as seen in Figures 3 and 4. The fish plates are thus held firmly against endwise movement.

Upon the upper face of each extension are formed recesses 13 in which are balls 14 upon which the base flange of the rail ends rest and upon which balls or rollers they are allowed to move as they expand and contract. The rabbets 15 and 16 may be of any desired length. The bolt holes in the rails should be elongated to allow of the usual expansion and contraction, in the usual manner.

The bolts which I employ for retaining the fish plates in position are preferably of the form shown in Figures 4 and 7, in which it will be seen that the bolt 17 is provided with a portion 18 screw threaded in one direction and a reduced tapered portion 19, the extreme end of which is screw threaded in the opposite direction as seen at 20. 21 is the nut which has a threaded portion 22 which is longitudinally split as seen at 23. 24 is a copper bond sleeved on the bolt. The slit in the nut allows of spreading of the nut on the bolt when screwed up tight.

Modifications in detail may be resorted to without departing from the spirit of the invention or sacrificing any of its advantages, for instance, as seen in Figure 9, the wire 8' has the lateral members 9' for insertion in a suitable bushing at each end in the rail.

What is claimed as new is:—

1. A bonding member comprising a body portion with its ends extended at substantially a right angle thereto and provided with free loops between the ends of the body portion and extended in a direction opposite to said angled ends.

2. A fish plate having upon its inner face a longitudinal groove, a recess and deeper recesses, and a bonding wire received in said recess and having free loops between its ends received in said deeper recesses and angled ends adapted to be received in openings in the web of a rail.

In testimony whereof I affix my signature.

JEREMIAH D. STURGEON.